United States Patent
Wang et al.

(10) Patent No.: US 9,602,605 B2
(45) Date of Patent: Mar. 21, 2017

(54) SHARING DIGITAL CONTENT ON A SOCIAL NETWORK

(75) Inventors: James Wang, San Francisco, CA (US); Akhil Wable, Palo Alto, CA (US); Oswald Soleio Cuervo, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1231 days.

(21) Appl. No.: 12/259,254

(22) Filed: Oct. 27, 2008

(65) Prior Publication Data

US 2009/0144392 A1    Jun. 4, 2009

Related U.S. Application Data

(60) Provisional application No. 61/000,682, filed on Oct. 26, 2007.

(51) Int. Cl.
  G06F 15/16     (2006.01)
  H04L 29/08     (2006.01)
  G06Q 10/10     (2012.01)

(52) U.S. Cl.
  CPC ............. *H04L 67/22* (2013.01); *G06Q 10/10* (2013.01); *H04L 67/306* (2013.01)

(58) Field of Classification Search
  CPC ........ G06Q 10/10; H04L 67/306; H04L 67/22
  USPC ................................................. 709/204, 205
  See application file for complete search history.

(56) References Cited

U.S. PATENT DOCUMENTS

| | | | |
|---|---|---|---|
| 6,542,936 B1 | 4/2003 | Mayle et al. | |
| 2003/0063770 A1* | 4/2003 | Svendsen et al. | 382/100 |
| 2006/0136419 A1* | 6/2006 | Brydon et al. | 707/9 |
| 2006/0259957 A1* | 11/2006 | Tam et al. | 726/3 |
| 2007/0168463 A1* | 7/2007 | Rothschild | 709/217 |
| 2007/0198506 A1* | 8/2007 | Attaran Rezaei et al. | 707/5 |
| 2008/0313256 A1* | 12/2008 | Kanazawa et al. | 709/201 |
| 2009/0043754 A1* | 2/2009 | Faris et al. | 707/5 |

FOREIGN PATENT DOCUMENTS

WO    WO 2007/052285 A2    5/2007

OTHER PUBLICATIONS

PCT International Search Report and Written Opinion, PCT/US2008/081387, Jan. 15, 2009, 8 Pages.

* cited by examiner

*Primary Examiner* — Joseph Greene
(74) *Attorney, Agent, or Firm* — Fenwick & West LLP

(57) ABSTRACT

Embodiments of the invention provide techniques for more effectively and easily sharing on a social networking system digital content obtained from an external system. In one embodiment a user selects a control for sharing content from the external system that causes a sharing request to be sent. The sharing request is received by the social networking website, and an interface is presented to the user requesting sharing parameters. The user provides sharing parameters through the interface that are received by the social networking website. Content is retrieved from the external system and is transmitted to one or more destinations in the social networking website based at least in part on the sharing parameters. The sharing parameters may include selection parameters for indicating which content to share, formatting parameters for specifying how to format the content, and destination parameters indicating particular destinations in the social networking website for the content.

28 Claims, 7 Drawing Sheets

SHARING DIGITAL CONTENT ON A SOCIAL NETWORK

CROSS REFERENCE TO RELATED APPLICATIONS

This application claims the benefit of U.S. Application No. 61/000,682, filed Oct. 26, 2007, which is incorporated by reference in its entirety.

BACKGROUND

This invention relates to social networking websites and in particular to sharing on a social networking website digital content obtained from an external system.

Social networks, or social utilities that track and enable connections between members (including people, businesses, and other entities), have become prevalent in recent years. In particular, social networking websites allow members to communicate relevant information more efficiently. For example, a member may post contact information, background information, job information, hobbies, and/or other member-specific data to a location associated with the member on a social networking website. Other members can then review the posted data by browsing member profiles or searching for profiles including specific data. The social networking websites also allow members to associate themselves with other members, thus creating a web of connections among the members of the social networking website.

Conventionally, when a user who is also a member of a social network wishes to share information with other members of the social network, the user generally copies and pastes the information to a location on the social network or forwards the information in the form of a message or email to other members. Often, certain forms of information do not copy and paste very well from one medium to another, and additional formatting or modifications to the information may be required before it is suitable for viewing by other members. Moreover, members who receive this shared information and subsequently wish to forward it may be required to repeat the formatting process. As a result, the quality of shared information may be compromised and members may be less likely to share information with each other. Furthermore, outdated shared information may accumulate in locations within the social network, further dampening the incentive for members to share content. Additionally, there is often no way of tracking the shared information within the social network.

SUMMARY

Addressing these deficiencies in existing systems, embodiments of the invention provide techniques for more effectively and easily sharing on a social networking system digital content obtained from an external system. In one embodiment a user views content on an external system that the user desires to share in the social networking website. The user selects a control in a web browser or on a web page of the external system. The control may execute code that causes a sharing request to be sent to the social networking website. The sharing request is received by the social networking website, and information is sent from the social networking website for presenting an interface to the user. The interface is capable of requesting sharing parameters from the user for sharing the content in the social networking website. The interface may be a web page capable of receiving user input. The user provides sharing parameters that are received by the social networking website. Content is retrieved from the external system and is transmitted to one or more destinations in the social networking website based at least in part on the sharing parameters. The sharing parameters may include selection parameters for indicating which content to share, formatting parameters for specifying how to format the content, and destination parameters indicating particular destinations in the social networking website for the content. The shared content can also be tracked in the social networking website and updated responsive to changes in the source content in the external system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social network offers its members the ability to communicate and interact with other members of the social network. In use, members join the social network and then add connections to a number of other members to whom they desire to be connected. Connections may be added explicitly by a member, for example, the member selecting a particular other member to be a friend, or automatically created by the social network based on common characteristics of the members (e.g., members who are alumni of the same educational institution). As used herein, the term "friend" refers to any other member to whom a member has formed a connection, association, or relationship via the website. Connections in social networks are usually in both directions, but need not be, so the terms "member" and "friend" may depend on the frame of reference. For example, if Bob and Joe are both members and connected to each other in the website, Bob and Joe, both members, are also each other's friends. The connection between members may be a direct connection; however, some embodiments of a social network allow the connection to be indirect via one or more levels of connections. Also, the term friend need not require that members actually be friends in real life, (which would generally be the case when one of the members is a business or other entity); it simply implies a connection in the social network.

Social networks can be implemented in various types of systems. The implementation of the social network can provide mechanisms for members to communicate with each other, form connections with each other, store information, and share objects of interest, among other things. The implementation described below includes a social networking website that interacts with members at client computing devices through a web-based interface. However, other implementations are possible, such as one or more servers that communicate with clients using various client and server applications (e.g., non-web-based applications). Additionally, a social networking system may not include any centralized server, but rather may be implemented as a peer-to-peer system with peer-to-peer applications running on the clients that allow members to communicate and perform other functions. One example is a peer-to-peer network of smart phones communicating via Short Message Service (SMS) over a cellular network. It can be appreciated that the embodiments of a social networking website described below can be adapted to various other implementations of social networking systems.

Figure 1:
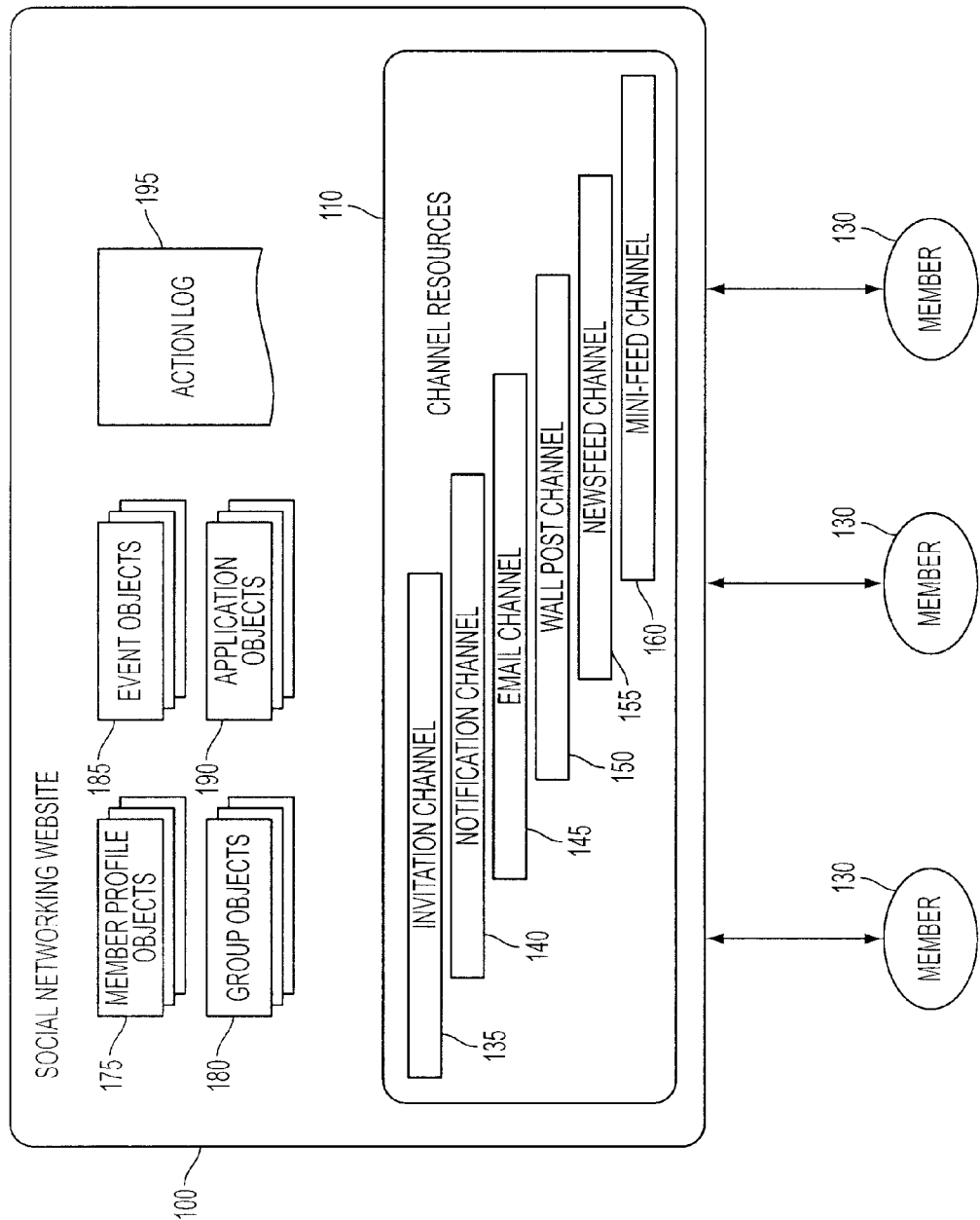
FIG. 1 illustrates a social network implemented as a social networking website, in one embodiment.

FIG. 1 illustrates a social network implemented as a social networking website 100, in one embodiment. The social networking website 100 provides various mechanisms to its members to communicate with each other or to obtain information that they find interesting, such as activities that their friends are involved with, applications that their friends are installing, and comments made by friends on activities of other friends, just to name a few examples. The mechanisms of communication between members are called channels, available as channel resources 110. In one embodiment, a channel is a computer mediated communication mechanism for facilitating communication between or among users of the social networking website 100 and/or the social networking website 100 itself.

The following channels may be available to users of a social networking website 100, in one embodiment:

An invitation channel 135 communicates one or more invitations between users. An invitation is a message sent by a member inviting another member to do something, e.g., a member can invite his friend to install an application.

A notification channel 140 communicates a message informing a member that some activity involving the member has occurred on the social networking website 100.

An email channel 145 allows members to communicate by email.

A wall Post channel 150 allows members to share information between friends. A wall is an application allowing members to write interesting information to be shared between friends. A message written to a member's wall is called a wall post. A member can post on his own wall, as well as walls of all his friends. A friend of a member can see what is written on his wall.

A newsfeed channel 155 informs a member of activities of the member's friends. The newsfeed is constantly updated as the member's friends perform various activities, such as adding applications, commenting on photos, or making new friends.

A mini-feed channel 160 provides a mini-feed listing actions taken by the member. For example, the member may have added new friends to his social network or installed certain applications. One or more of a member's activities may be listed in the mini-feed of that member.

In addition to interactions with other members, the social networking website 100 provides members with the ability to take actions on various types of items supported by the website. These items may include groups or networks (where "networks" here refer not to physical communication networks, but rather to social networks of people) to which members of the website may belong, events or calendar entries in which a member might be interested, computer-based applications that a member may use via the website, and transactions that allow members to buy, sell, auction, rent, or exchange items via the social networking website 100. These are just a few examples of the items upon which a member may act on the social networking website 100, and many others are possible.

As illustrated in FIG. 1, the social networking website 100 maintains a number of objects for the different kinds of items with which a member 130 may interact on the website 100. In one example embodiment, these objects include member profiles 175, group objects 180, event objects 185, application objects 190 (respectively, hereinafter, profiles 175, groups 180, events 185, and applications 190). In one embodiment, an object is stored by the website 100 for each instance of its associated item. For example, a member profile 175 is stored for each member who joins the website 100, a group 180 is stored for each group defined in the website 100, and so on. The types of objects and the data stored for each is described in more detail below in connection with FIG. 1.

The member 130 of the website 100 may take specific actions on the website 100, where each action is associated with one or more objects. The types of actions that a member may perform in connection with an object are defined for each object and largely depend on the type of item represented by the object. A particular action may be associated with multiple objects. Described below are a number of examples of particular types of objects that may be defined for the social networking website 100, as well as a number of actions that can be taken for each object. These objects and the actions discussed herein are provided for illustration purposes only, and it can be appreciated that an unlimited number of variations and features may be provided on the social networking website 100.

The social networking website 100 maintains a member profile 175 for each member of the website 100. Any action that a particular member takes with respect to another member is associated with each member's profile 175, through information maintained in a database or other data repository, such as the action log 195. The tracked actions may include, for example, adding a connection to the other member, sending a message to the other member, reading a message from the other member, viewing content associated with the other member, attending an event posted by another member, among others. In addition, a number of actions described below in connection with other objects may be directed at particular members, in which case these actions may be associated with those members as well.

A group 180 may be defined for a group or network of members. For example, a member may define a group to be a fan club for a particular band. The website 100 would maintain a group 180 for that fan club, which might include information about the band, media content (e.g., songs or music videos) by the band, and discussion boards on which members of the group can comment about the band. Accordingly, member actions that are possible with respect to a group 180 might include joining the group, viewing the content, listening to songs, watching videos, and posting a message on the discussion board.

Similarly, an event 185 may be defined for a particular event, such as a birthday party. A member may create the event 185 by defining information about the event such as the time and place and a list of invitees. Other members may accept the invitation, comment about the event, post their own content (e.g., pictures from the event), and perform any other actions enabled by the website 100 for the event 185. Accordingly, the creator of the event 185 as well as the invitees for the event may perform various actions that are associated with that event 185.

The social networking website 100 also enables members to add applications to their profiles. These applications provide enhanced content and interactivity within the social networking website 100, which maintains an application object 190 for each application hosted in the system. The applications may be provided by the website operator and/or by third party developers. An example application is an enhanced messaging service, in which members can send virtual objects (such as a "gift" or "flowers") and an optional message to another member. The use of any functionality offered by the application may thus constitute an action by the member in connection with the application 190. In addition, continuing the example from above, the receipt of the virtual gift or message may also be considered an action in connection with the application 190. It can therefore be appreciated that actions may be passive and need not require active participation by a member. The scope and type of applications provided is limited only by the imagination and creativity of the application developers. Applications are generally written as server-side code that is run on servers of the social networking website 100; an application may also use client-side code as appropriate. Generally, when a user logs into the site, the system determines which applications the user has installed (e.g., registered for) and then loads and runs such applications in combination with the underlying functionality of the social networking website 100.

When a member takes an action on the social networking website 100, the action is recorded in an action log 195. In one embodiment, the website 100 maintains the action log 195 as a database of entries. When an action is taken on the website 100, therefore, the website 100 adds an entry for that action to the log 195. In one embodiment, an entry comprises some or all of the following information:

Time: a timestamp of when the action occurred.
Member: an identifier for the member who performed the action.
Target: an identifier for the member to whom the action was directed.
Action Type: an identifier for the type of action performed.
Object: an identifier for an object acted on by the action e.g., an application.
Content: content associated with the action.

It can be appreciated that many types of actions that are possible in the website 100 need not require all of this information. For example, if a member changes a picture associated with the member's profile, the action may be logged with just the member's identifier, an action type defining a picture change, and the picture or a link thereto as the content.

Figure 2:
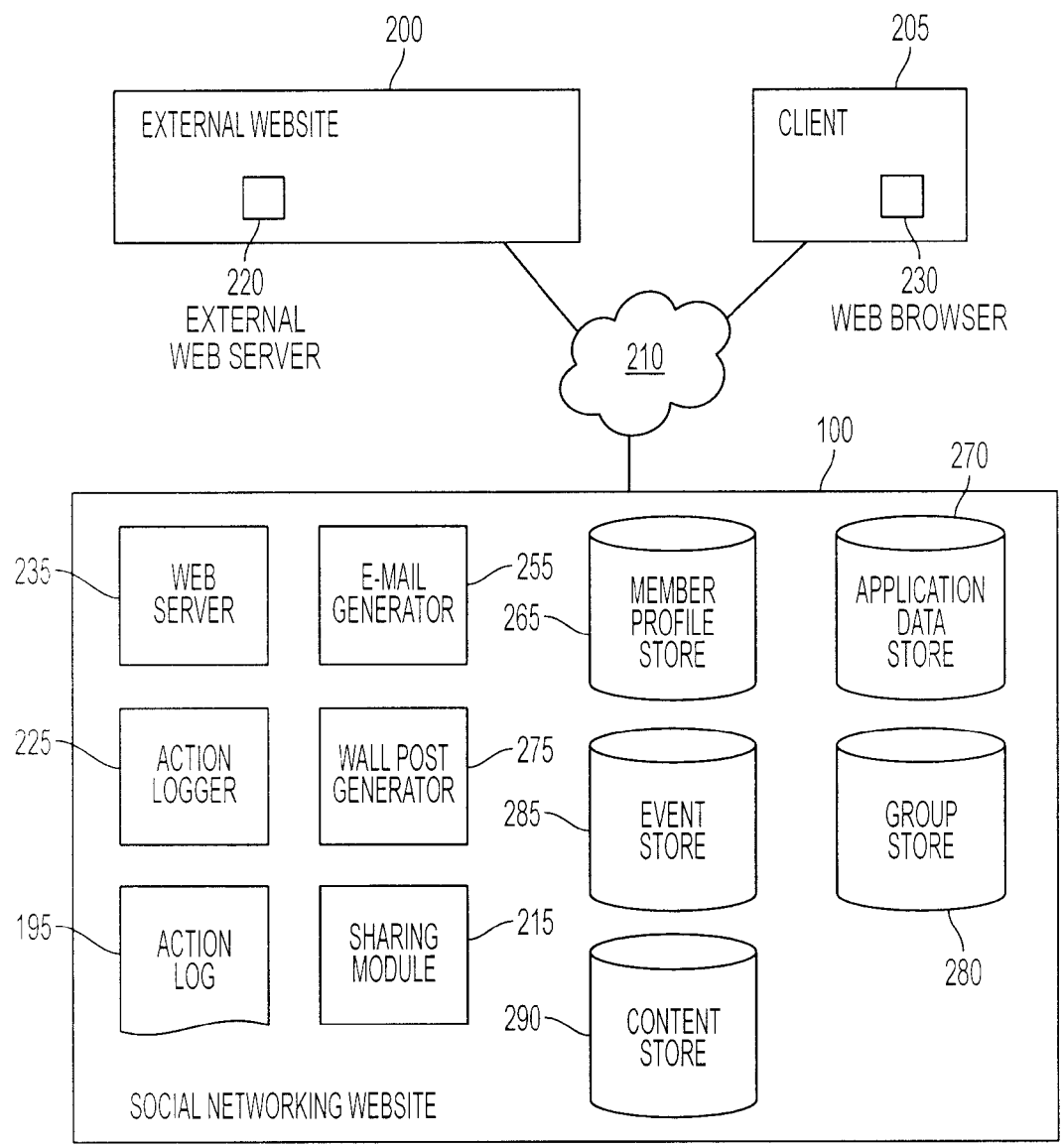
FIG. 2 is a high level block diagram illustrating a system environment suitable for operation of a social networking website, in one embodiment.

FIG. 2 is a high level block diagram illustrating a system environment suitable for operation of a social networking website 100, in one embodiment. The system environment comprises one or more client devices 205, one or more third party websites 200, a social networking website 100, and a network 210. In alternative configurations, different and/or additional modules can be included in the system.

The client devices 205 comprise one or more computing devices that can receive member input and can transmit and receive data via the network 210. For example, the client devices 205 may be desktop computers, laptop computers, smart phones, personal digital assistants (PDAs), or any other device including computing functionality and data communication capabilities. The client devices 205 are configured to communicate via network 210, which may comprise any combination of local area and/or wide area networks, using both wired and wireless communication systems. The client devices 205 may be running a web browser 230 that allows users at the client devices to view web pages served by the social networking website 100 or external websites 200. These users may be members of the social networking website 100. Other applications similar to web browser 230 may also be run on the client device 205 to view content from the social networking website 100 or external websites 200.

The social networking website 100 comprises a computing system that allows members to communicate or otherwise interact with each other and access content as described herein. The social networking website 100 stores member profiles that describe the members of a social network, including biographic, demographic, and other types of descriptive information, such as work experience, educational history, hobbies or preferences, location, and the like. The website 100 further stores data describing one or more relationships between different members. The relationship information may indicate members who have similar or common work experience, group memberships, hobbies, or educational history. Additionally, the social networking website 100 may include member-defined relationships between different members, allowing members to specify their relationships with other members. For example, these member-defined relationships allows members to generate relationships with other members that parallel the members' real-life relationships, such as friends, co-workers, partners, and so forth. Members may select from predefined types of relationships, or define their own relationship types as needed.

The external websites 200 comprise one or more computing devices that provide content to viewers. The external web servers 220 provide this content for viewing by users at clients 205. The users may share content from the external websites 200 with members of the social networking website 100, as described below. The external websites 200 are generally any websites that provide content that may be shared. The external websites 200 may provide several pieces of content on a particular web page, and a user may select particular pieces of content for sharing. It is possible that a social networking website 100 may also be an external website 200 in a particular situation if a user desires to share content appearing on the social networking website 100.

Other external systems besides external websites 100 can also provide content to viewers that may be shared with members of the social networking website 100. The external systems may include servers that provide e-books, electronic documents in various formats, videos, or other types of content. This content may be provided through various server and client applications besides web servers and web browsers. Content can also be created or received locally at a client 205, such as content from a DVD or digital camera. In this case, the client 205 can also be considered an external system providing content. As with content from an external website 200, a user may desire to select particular pieces of content from an external system for sharing and may desire to format the pieces of content in various ways. Although the description below is focused on a user viewing content from an external website 100 in a web browser 230 and selecting and formatting the content from the web browser, the user may also view, select, and format content from other external systems using other various applications. It can be appreciated that the embodiments described below can be adapted to other types of external systems.

FIG. 2 contains a block diagram of the social networking website 100. In this embodiment, the social networking website 100 includes a web server 235, an action logger 225, an action log 195, a wall post generator 275, an email generator 255, a sharing module 215, a member profile store 265, an application data store 270, a group store 280, a shared content store 290, and an event store 285. In other embodiments, the social networking website 100 may include additional, fewer, or different modules for various applications. Conventional components such as network interfaces, security mechanisms, load balancers, failover servers, management and network operations consoles, and the like are not shown so as to not obscure the details of the system.

The web server 235 links the social networking website 100 via the network 210 to one or more client devices 205. The web server 235 serves web pages, as well as other web-related content, such as Java, Flash, XML, and so forth. The web server 235 may include a mail server or other messaging functionality for receiving and routing messages between the social networking website 100 and the client devices 205. The messages can be instant messages, queued messages (e.g., email), text and SMS messages, or any other suitable messaging technique.

The action logger 225 is capable of receiving communications from the web server 235 about member actions on and/or off the social networking website 100. The action logger 225 populates the action log 195 with information about member actions to track them.

The wall post generator 275 generates wall post messages for members. For example, a message about a new application being available may be posted on a member's wall. The email generator 255 generates email messages to members.

As discussed above, the social networking website 100 maintains data about a number of different types of objects with which a member may interact on the website 100. To this end, each of the member profile store 265, application data store 270, the group store 280, and the event store 285 stores instances of the corresponding type of object maintained by the website 100. Each object type has information fields that are suitable for the storing information appropriate to the type of object. For example, the event store 285 contains data structures that include the time and location for an event, whereas the member profile store 265 contains data structures with fields suitable for describing a member's profile. When a new object of a particular type is created, the website 100 initializes a new data structure of the corresponding type, assigns a unique object identifier to it, and begins to add data to the object as needed. This might occur, for example, when a member defines a new event, wherein the website 100 would generate a new instance of an event in the event store 285, assign a unique identifier to the event, and begin to populate the fields of the event with information provided by the member.

The sharing module 215 allows the sharing of content from external websites 200 with members of the social networking website 100. The sharing module 215 is capable of receiving a request to share content, retrieving the content from the external website 200, and storing the content in the social networking website 100. The shared content store 290 may be used for storing this content, also referred to as shared content. The sharing module 215 is also capable of formatting the shared content, transmitting the stored content to various destinations in the social networking website 100, and tracking the shared content.

Figure 3:
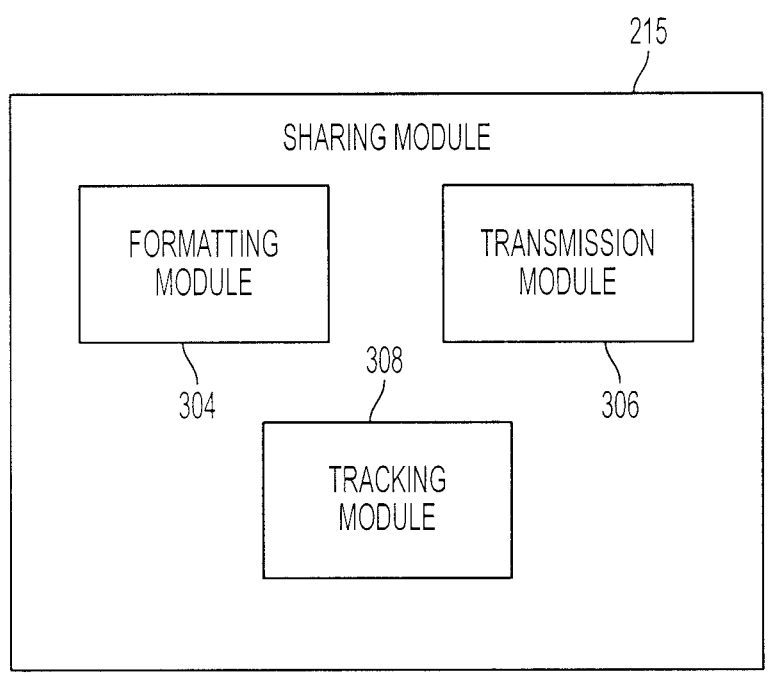
FIG. 3 is a high level diagram illustrating the sharing module, in one embodiment.

FIG. 3 is a high level diagram illustrating the sharing module 215, in one embodiment. The sharing module 215 includes a formatting module 304, a transmission module 306, and a tracking module 308. The formatting module 304 is configured to receive the request to share content, also referred to as the sharing request. This request can originate from the web browser 230 or the social networking website 100. The sharing request may include the location of the content to be shared, such as a URL. The formatting module 304 is configured to present a user interface to a user at a web browser 230 requesting sharing parameters from the user. These sharing parameters can include selection parameters indicating which pieces of content are to be shared, formatting parameters for formatting those pieces of content, and destination parameters specifying destinations within the social networking website 100 for the pieces of content. The formatting module 304 is capable of retrieving and formatting the appropriate content for sharing based on the sharing parameters received from the user.

The transmission module 306 is configured to receive the formatted content and destination information for the content from the formatting module 304. The transmission module is capable of transmitting the formatted content to the destinations in the social networking website specified by the destination parameters. Various possible destinations include member profile objects 175, group objects 170, event objects 185, application objects 190, wall postings, and email messages. The transmission module 306 is also configured to log the sharing of content and enable the further sharing of content within the social networking website 100.

The tracking module 308 is configured to track shared content within the social networking website 100. The tracking module can receive a notification from the transmission module 306 indicating that particular shared content has been added to particular destinations of the social networking website 100. The tracking module 308 is capable of updating the shared content in the social networking website 100 responsive to changes to the source of the shared content at an external website 200. The tracking module 308 is also capable of determining the popularity of particular shared content within the social networking website based on the extent of the sharing of the content and other factors.

Figure 4:
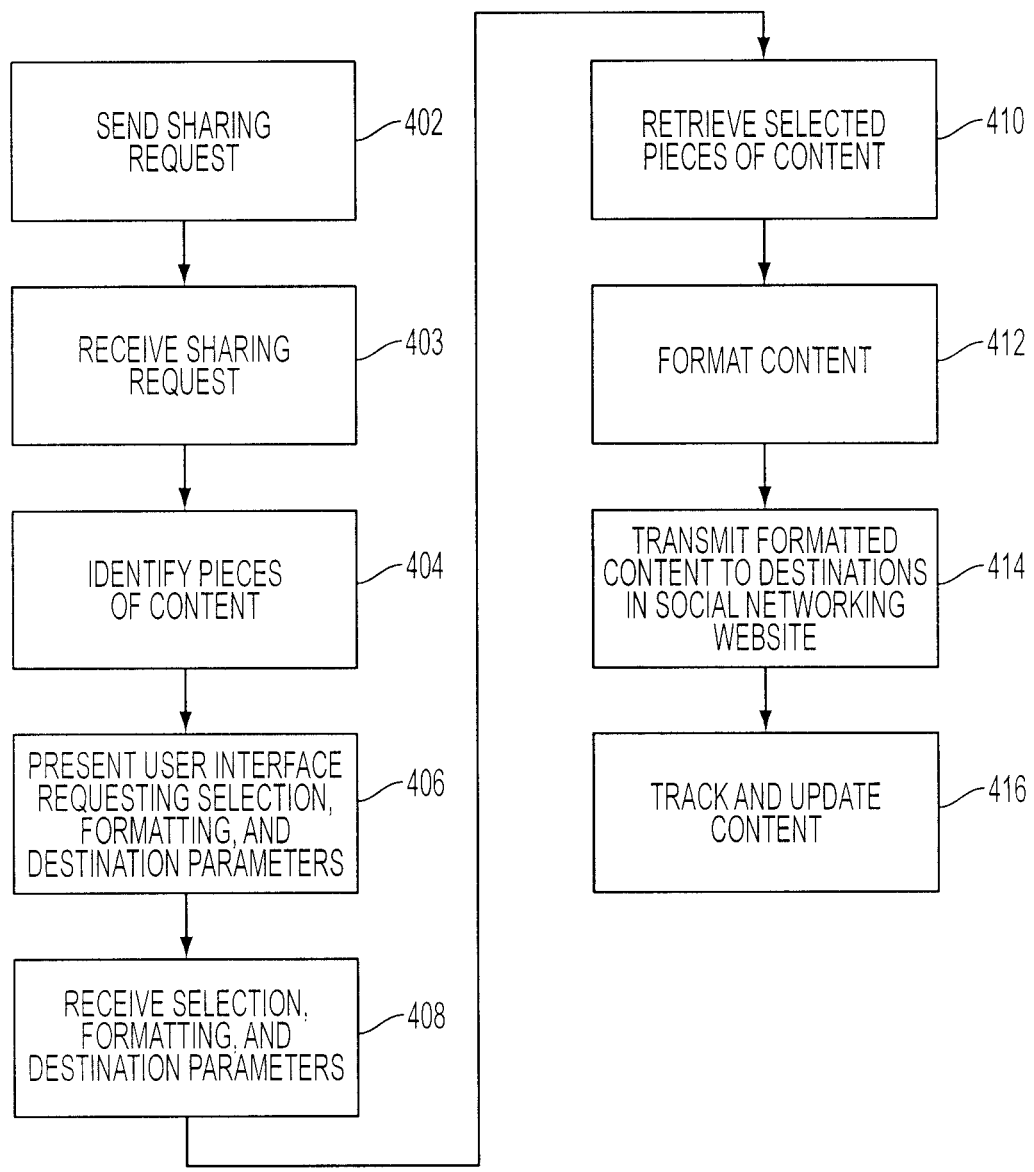
FIG. 4 illustrates a method for sharing content on a social networking website, in one embodiment

Embodiments of the system described above can be used for sharing content on a social networking website. FIG. 4 illustrates a method for sharing content on a social networking website 100, in one embodiment. Initially, a sharing request is sent 402 based on a selection by a user to share content. The user may make the selection while viewing a web page from an external website 200 on a web browser 230 at a client 205. This web page can be provided to the user's web browser 230 from the external web server 220. The user then makes a selection indicating that the user desires to share content from the web page with members of the social networking website 100. The content may be, for example, text, images, or videos from the web page. The user selection may cause code, such as JavaScript or HTML, to be executed in the user's web browser 230 that causes a sharing request to be sent 402 to the social networking website 100 from the browser. This code may be downloaded to the web browser from the external website 200 or the social networking website 100. It is also possible for the user selection to cause code to be executed on the external website 200 or social networking website 100, and the sharing request can be sent 402 from either of those locations. These possibilities are described further in connection with FIG. 5 below.

Figure 5:
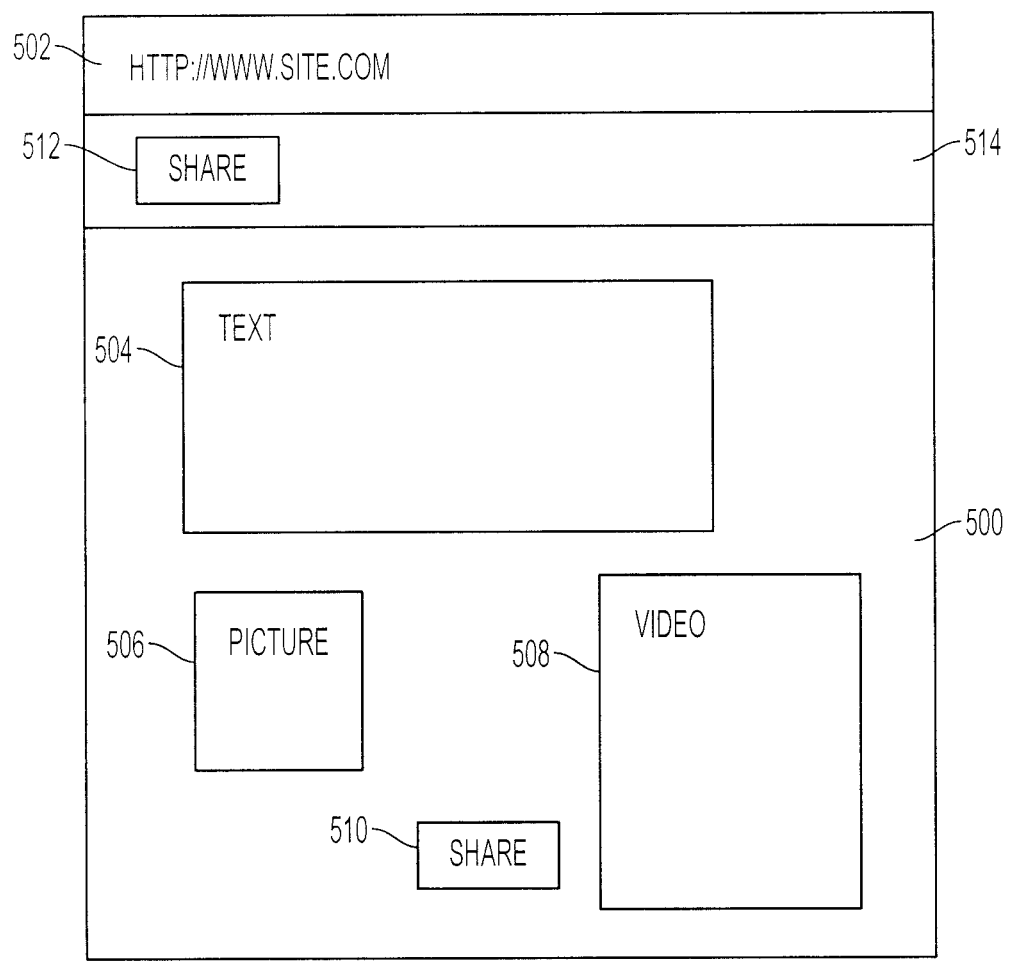
FIG. 5 illustrates a web page from an external website displayed in the web browser of a user, in one embodiment.

FIG. 5 illustrates a web page 500 from an external website 200 displayed in the web browser 230 of a user who is a member of the social networking website 100, in one embodiment. The web page 500 is referenced by a Uniform Resource Locator (URL) 512. The web page 500 includes various types of content, including a block of text 504, a picture 506, and a video 508. The illustrated web page 500 is merely an example of a web page containing content that can be shared. Generally, the web page 500 may include any of a wide variety of content types in various configurations and layouts. The user may desire to share some or all of this content with other members of the social networking website 100. In order to share the content, user interface controls 510 and 512 are provided. These controls 510 and 512, when selected by the user, cause a sharing request to be sent 402 to the sharing module 215 of the social networking website 100. In response to the sharing request, the sharing module 215 retrieves content to be shared. Controls 510 and 512 can be implemented as buttons, icons, selectable links, or various other selectable objects. The controls for indicating a desire to share content may comprise browser controls 512 and/or web page controls 510.

A browser control 512 may be installed in the user's web browser 230, for example in a toolbar 514 of the browser. Instructions or software for installing the browser control 512 may be provided by the social networking website 100. A browser control 512 may be present regardless of whether the web page 500 is displayed, and is used to share content from that web page. When selected by a user, the browser control 312 causes a sharing request to be sent 402 to the social networking website 100. This sharing request may include the URL 502 of the web page 500 and other information about the web page, such as the types of content on the web page. The browser control 512 may be linked to code that executes in the web browser 230 and causes the request to be sent from the browser. For example, the browser control 512 is a bookmark containing a JavaScript applet (e.g., a "bookmarklet") that causes the sharing request to be sent 402. In one embodiment, the browser control may not directly send a sharing request, but rather may send a notification to the social networking website 100 that causes the social networking website to generate the sharing request. In this case, the sharing request may be sent 402 within the social networking website to the sharing module 215. The browser control 512 may be located in a toolbar 514 intended for frequently used bookmarks, and the applet code can be activated when the bookmark is selected.

A web page control 510 similarly causes a sharing request to be sent 402 to the social networking website 100. Unlike the browser control 512, the web page control 510 is provided by the external website 200 and is included on the web page 500. The operator of the external website 200 can obtain instructions or software for installing web page controls 510 on its web pages 500 from the social networking website 100. The operator of the external website 200 may include web page controls 510 to encourage content from the website to be shared in social networks. The web page control 510 may be associated with code provided by the external website 200, such as HyperText Markup Language (HTML) or JavaScript, that executes in the web browser 230 and causes the sharing request to be sent 402 from the browser when the control is selected by a viewer of the web page 500. Alternatively, the web page control 510, when selected, may send a notification (e.g., a HTTP request) to the external website 200 or the social networking website 100, either of which then creates and sends 402 the sharing request. A web page control 510 may be associated with a specific piece of content that is available for sharing. For example, the web page control 510 illustrated in FIG. 5 is associated with the video content 508. When the web page control 510 is selected, the sharing request sent to the social networking website may identify the video 508 as the content on the web page 508 to be shared, for example by including a URL of the video in the request. This identification of content for sharing can also be used as a selection parameter, described below.

Returning to FIG. 4, after the sharing request is sent 402, it is received 403 by the formatting module 304 of the sharing module 215 in the social networking website 100. The formatting module 304 then identifies possible pieces of content on the web page 500 indicated in the sharing request. Pictures, segments of text, videos, or other pieces of content may be considered possible candidates for sharing. If the sharing request indicates a specific piece of content to be shared, the formatting module 304 may limit the possible shared content to the specified content. This may occur, for example, with a web page control 510 that is associated with a particular piece of content. The formatting module 304 may filter the possible content available for sharing based on the type of content (e.g., text, video, image), metadata associated with the content, the size (e.g., in bytes or in pixels) of the content, the content creation date, modification date, file name, origin, or other properties. This filtering may be useful in removing from consideration content that is unlikely to be shared, such as a small standard navigational graphic image. The filtering may also prevent sharing of content that is not suitable for sharing on the social networking website 100, such as videos of copyrighted material, or images in an unsupported file format. The formatting module 304 can also identify a default piece of content having characteristics making it a likely candidate for sharing and suggest this default piece of content to the user (while also allowing the user to select other pieces of content). The default piece of content can be identified using various heuristics.

The formatting module 406 then presents 406 an interface to the user requesting parameters for sharing content, also referred to as sharing parameters, from the user. The sharing parameters can include selection, formatting, and/or destination parameters. Different embodiments may allow the user to select one or more of these types of parameters. The selection parameters may include an indication of which of the identified pieces of content the user desires to share. The formatting parameters include options for formatting the selected pieces of content for sharing. These options can include the size, shape, or layout of the pieces of content. The options may also include a user comment to be attached to the shared content. The destination parameters specify where to send the formatted pieces of content within the social networking websites. For example, the user can specify that the content be emailed to a member or posted to the user's profile page, the user's wall, a group page, or an event page. The destination parameters can also include the membership credentials of the user (e.g., the user's member name and password for the social networking website 100). These membership credentials can be used to ensure that the content is posted only to areas where the member has permission to post. The interface to the user may be presented 406 through a formatting screen that allows the user to input various values or selections for the parameters. The formatting screen may be a web page created by the formatting module 304, served by the web server 235 of the social networking website 100, and viewed by the user on the web browser 230.

Figure 6:
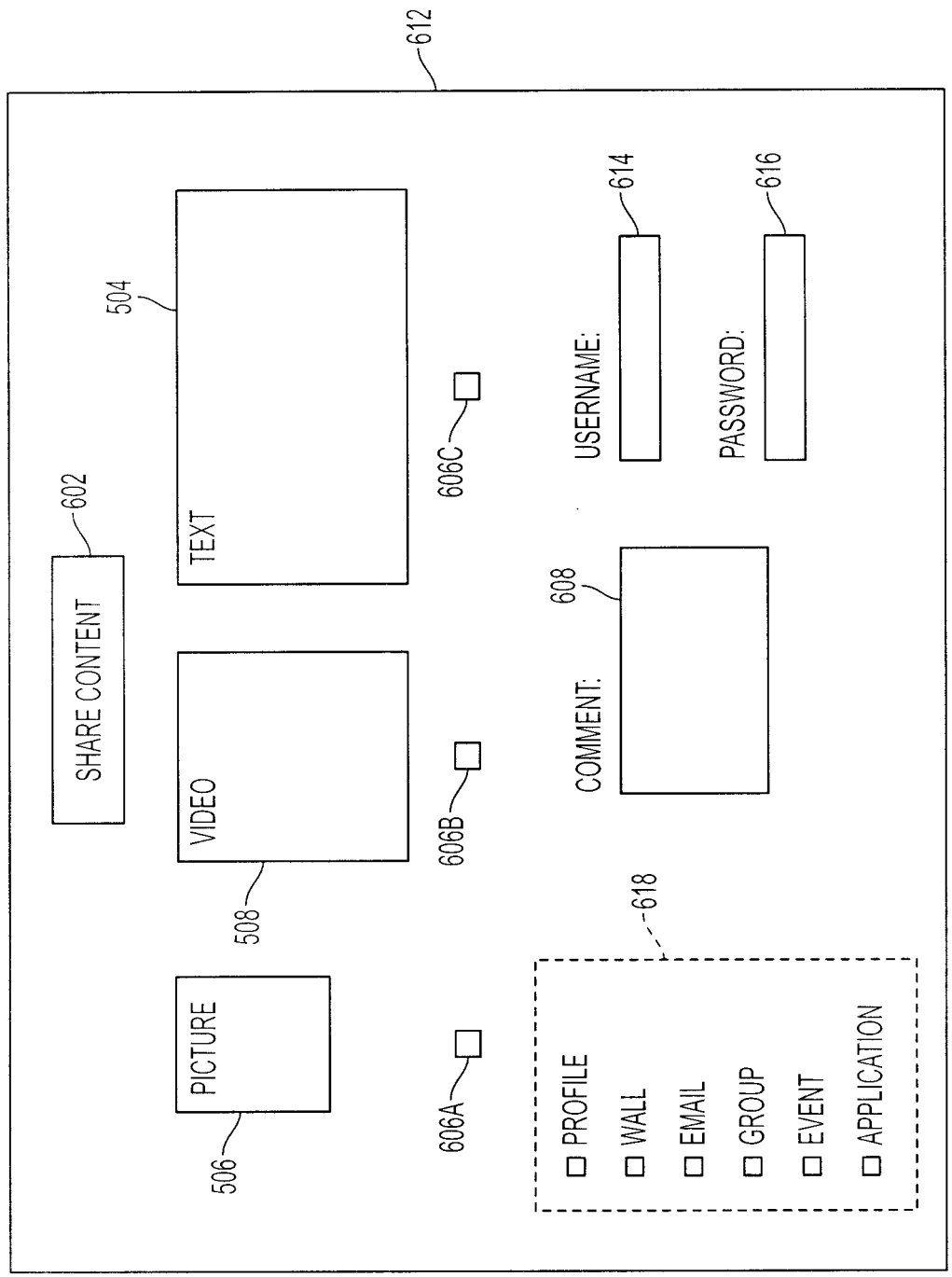
FIG. 6 illustrates a formatting screen that is presented to a user by the formatting module, in one embodiment.

FIG. 6 illustrates a formatting screen 612 that is presented 406 to a user by the formatting module 304, in one embodiment. The formatting screen 612 includes pieces of content identified 404 from the external web page 500. Here, three pieces of content are included: picture 506, video 508, and text 504. Each piece of content has an associated checkbox control 606. These checkboxes controls 606 are selected by the user to indicate that the associated piece of content should be shared. The user can share multiple pieces of content by checking multiple checkbox controls 606. Checkbox controls 618 allow the user to specify the destinations of the shared content. For example, the content may be shared by emailing it to other members or by presenting it on the user's profile page, the user's wall, a group page, or an event page. A further screen can be presented if more details are needed (e.g., the name of the group or event).

A comment box 608 may be provided for the user to enter a comment to be displayed along with the shared content. Text entry boxes may be provided to allow the user to enter the user's member name (or email address) 614 and password 616 associated with the user's account on the social networking website 100 so that the shared content can be sent to the appropriate destinations. When the information on the formatting screen 612 has been completed, the user can select the share content button 602 to submit the entered information to the formatting module 304. In this example formatting screen 612, the checkboxes 606 allow the user to specify selection parameters, the checkboxes 618 and text boxes 614 and 616 allow the user to specify destination parameters, and the text box 608 allows the user to specify formatting parameters. It can be appreciated that various other types of controls can be used for obtaining information from the user for selecting content for sharing, for formatting the content, for specifying destinations of the content, and for other purposes.

Returning to FIG. 4, the formatting module 304 receives any 408 selection parameters, formatting parameters, and destination parameters submitted by the user through the user interface (e.g., formatting screen 612). The user is not required to submit all types of parameters, and may only submit destination parameters, for example. The selection parameters may also be extracted from the received sharing request if the sharing request specifies the content to be shared and the user is not given the option of modifying which content is to be shared. Based on the received selection parameters or other factors such as information contained in the sharing request, the formatting module 304 retrieves 410 the pieces of content selected for sharing (if the content was not already retrieved) from the external website 200.

The formatting module 304 may then format 412 the content for sharing on the social networking website 100. This formatting 412 may include processing the content for easier sharing. For example, an image file is converted into a standard type of image file used by the social networking website 100 and is also processed to reduce its file size. Audio or video files may be processed to facilitate their playback on the social networking website 100. The formatting module 304 may condense, summarize, rearrange, or resize the selected pieces of content or components of the pieces of content. It may also modify font styles, font sizes, links, languages, and text length, for example.

The formatted content is received by the transmission module 306 which transmits 414 the formatted content to various destinations within the social networking website 100. As mentioned above, the user can make selections for sending the shared content to various destinations. This information may be included in the destination parameters. In one embodiment, a single copy of the formatted shared content is stored in the shared content store 290. The transmission module 306 then creates links to the stored copy from the various destinations, avoiding the need to store multiple copies.

One possible destination of shared content is the user's member profile. In this case, the transmission module 306 updates the appropriate member profile object 175 in the member profile store 265 to include the shared content. This may include adding a reference to the shared content to the member profile object 175. If a selected destination is a group page, the transmission module 306 updates the appropriate group object 170 in the group store 280. If a selected destination is an event page, the transmission module 306 updates the appropriate event object 185 in the event store 285. If a selected destination is an application, the transmission module 306 updates the appropriate application object 190 in the application data store 270. If a selected destination is to a member's wall, the transmission module 306 may send the shared content through a wall post channel 150 to the appropriate member, and the wall post generator 275 then creates a wall post containing the shared content. If a selected destination is an email to one or more members, the transmission module 306 may send the shared content through an email channel 145 to the appropriate members, and the email generator 255 then creates email messages for delivery to the members.

In addition to transmitting 414 the formatted content to the destinations, the transmission module 306 may also create an entry in the action log 195 indicating that the content has been shared by the user. The entry may include a timestamp, member, object, content description, and destinations associated with the sharing. The entry is created using the action logger 225.

Figure 7:
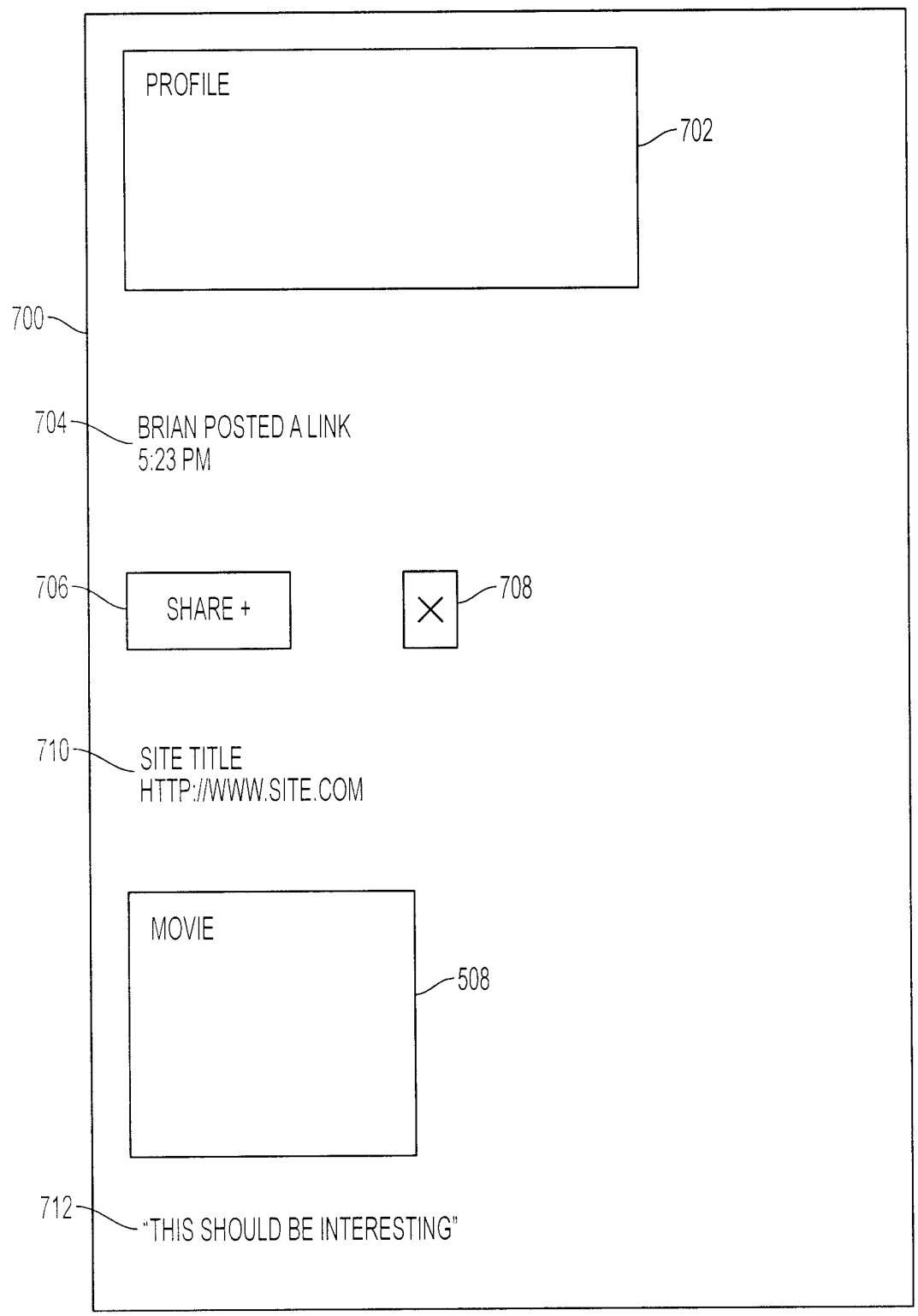
FIG. 7 illustrates shared content on a profile page of a member of the social networking website, in one embodiment.

FIG. 7 illustrates shared content on a profile page 700 of a member of the social networking website, in one embodiment. The data displayed on the profile page 700 is obtained from a member profile object 175 containing a reference to the shared content, in one embodiment. The shared content may have been transmitted 414 to the member profile object by the transmission module 306. The profile page 700 includes a profile description 702, which generally includes information about the member, such as the member's name, photo, birthday, and location. In the illustrated profile page 700, the member's name is "Brian" and the member has chosen to share movie 508 on his profile page. He may have originally seen movie 508 on an external website 200 and shared it using the process described above, specifying his profile as a destination for the shared content. He may have also specified various parameters for the layout and display of the movie 508 on his profile page 700 using the formatting screen 612.

The movie 508 is displayed on the profile page 700 along with related items 704, 706, 708, 710, and 712. The related items include a notification 704 of the posting of the shared content. The information displayed in the notification 704 may be obtained from an entry in the action log 195 associated with the sharing of the content. Also included is a share control 706. The share control 706 allows a user viewing the profile page 700 to share the content (e.g., the movie 308) again, so that it is displayed elsewhere in the social networking website 100. For example, a user may be viewing profile page 700 and desire to have a copy of the movie 508 appear on the user's profile page also. The share control 706 operates similarly to the website control 510 discussed above. It may cause a share request to be sent 402 to the formatting module 304 and a formatting screen 612 to be presented to the user. The formatting module can receive 408 parameters for sharing the content, and the content can then be transmitted 414 to specified additional destinations within the social networking website 100.

A delete control 708 allows the member associated with the profile (e.g., "Brian") to delete the shared content from the profile page 700. The transmission module 306 may remove the movie 508 from the profile page 700 by removing a reference to the movie from the appropriate member profile object 175. Site information 710 includes information about the origin of the shared content, such as a title and URL of the originating web page. This information may be stored by the transmission module 306 along with the shared content in the shared content store 290. Comment 712 is a comment describing the shared content provided by the member that posted the shared content (e.g., "Brian" in this case). The comment 712 may be provided in comment box 608 of formatting screen 612, received 408 as a formatting parameter, and stored along with the shared content in the shared content store 290.

Once the shared content has been transmitted 414 to various destinations, the tracking module 308 tracks 416 shared content within the social networking website 100. In one embodiment, the transmission module 306 notifies the tracking module 308 when the transmission module adds shared content to a destination in the social networking website 100. The tracking module 308 keeps track of the destinations (e.g., profiles, walls, emails) associated with each piece of shared content. The tracking module 308 may maintain a tracking database in the shared content store 290 for this purpose. The tracking module 308 may also keep track of the re-sharing of content within the social networking website 100, described above.

The tracking module 308 may update the shared content based on the status of the source of the shared content (e.g., a web page on the external website 200). In one embodiment, the tracking module 308 periodically checks the source of the shared content to determine if the original copy of the content has been deleted or modified. In response to the original content being deleted or modified, the tracking module 308 may cause the transmission module 306 to delete or modify the shared copy of the content in the shared content store 290 and to update the various destinations referencing the shared content. The tracking module 308 may also keep track of the popularity of pieces of shared content and display an indication of this popularity with the pieces of shared content. The popularity is determined by the number of locations in the social networking website 100 where the content is shared, or by the number of users that view the shared content, for example. The popularity may also be determined by analyzing where the shared content is placed by various members. For example, content that is regularly placed in profile pages may be deemed more popular than content regularly placed on member walls.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
for each of a plurality of users of a social networking system, maintaining a user account and a set of connections to other users of the social networking system;
receiving a sharing request for sharing content from a web page, the sharing request initiated by a sharing user via a sharing control outside of the social networking system and received by the social networking system;
responsive to initiation of the sharing request via the sharing control, providing an interface to the sharing user enabling the sharing user to provide sharing parameters, the interface served to the sharing user by a server of the social networking system;

receiving via the interface a request and one or more sharing parameters for communicating the content from the web page to one or more other users of the social networking system; and transmitting a communication containing at least a portion of the content to one or more other users with whom the sharing user has established a connection using one or more communication channels of the social networking system subject to the one or more sharing parameters.

2. The method of claim 1, further comprising:

receiving one or more sharing parameters from the sharing user via the interface.

3. The method of claim 2, wherein the sharing parameters comprise formatting parameters, the formatting parameters indicating formatting to apply to the content for sharing in the social networking system.

4. The method of claim 2, wherein the sharing parameters comprise destination parameters, the destination parameters indicating the one or more communication channels within the social networking system for sharing the content.

5. The method of claim 2, further comprising:

identifying a plurality of pieces of content on the web page suitable for sharing based on information in the sharing request; and sending information to the sharing user identifying the plurality of pieces of content, and wherein the sharing parameters comprise selection parameters, the selection parameters indicating which pieces of content the sharing user desires to share, and wherein the received portion of the content from the web page comprises the indicated pieces of content.

6. The method of claim 1, further comprising:

tracking the received portion of content at the one or more communication channels in the social networking website, comprising:

determining whether the received portion of content at the web page has been modified; and responsive to the received portion of content at the web page being modified, modifying the received portion of content at the one or more communication channels in the social networking system.

7. The method of claim 1, wherein the one or more communication channels in the social networking system comprise a wall profile channel.

8. A computer program product comprising a non-transitory computer-readable storage medium containing computer program code that comprises:

a module configured to maintain a user account and a set of connections to other users of the social networking system for each of a plurality of users of a social networking system;

a formatting module configured to:

receive a sharing request for sharing content from a web page, the sharing request initiated by a sharing user via a sharing control outside of the social networking system and received by the social networking system;

responsive to initiation of the sharing request via the sharing control, provide an interface to the sharing user enabling the sharing user to provide sharing parameters, the interface served to the sharing user by a server of the social networking system; and receiving from the sharing user via the interface a request and one or more sharing parameters for communicating the content from the web page to one or more other users of the social networking system; and a transmission module configured to:

transmit a communication containing at least a portion of the content to one or more other users with whom the sharing user has established a connection using one or more communication channels of the social networking system subject to the one or more sharing parameters.

9. The computer program product of claim 8, wherein the sharing parameters comprise selection parameters, the selection parameters indicating which content the sharing user desires to share.

10. The computer program product of claim 8, wherein the sharing parameters comprise formatting parameters, the formatting parameters indicating formatting to apply to the received portion of content for sharing in the social networking system, and wherein the formatting module is further configured to:

format the content based on the formatting parameters.

11. The computer program product of claim 8, wherein the sharing parameters comprise destination parameters, the destination parameters indicating one or more communication channels of the social networking system for sharing the received portion of content, and wherein the transmission module is further configured to:

transmit the received portion of content to the indicated communication channels within the social networking system.

12. The computer program product of claim 8, wherein the formatting module is further configured to:

identify a plurality of pieces of content on the web page suitable for sharing based on information in the sharing request; and send information to the sharing user identifying the plurality of pieces of content, and wherein the sharing parameters comprise selection parameters, the selection parameters indicating which pieces of content the sharing user desires to share, and wherein the received portion of content from the web page comprises the indicated pieces of content.

13. The computer program product of claim 8, further comprising:

a tracking module configured to track the received portion of content at the one or more communication channels in the social networking system, the tracking comprising:

determining whether the content at the web page has been modified; and responsive to the content at the web page being modified, modifying the received portion of content at the one or more communication channels in the social networking system.

14. The computer program product of claim 10, wherein the one or more communication channels in the social networking system comprise a wall profile channel.

15. The method of claim 2, wherein the sharing parameters comprise selection parameters, the selection parameters indicating which content from the web page the sharing user desires to share.

16. The method of claim 1, wherein the one or more communication channels used to transmit the received portion of content is selected from a plurality of communication channels associated with the sharing user.

17. The method of claim 1, wherein the sharing control is located on the web page.

18. The method of claim 1, wherein the sharing control is located on a toolbar of a browser application used by the sharing user to view the web page.

19. The method of claim 1, wherein the interface comprises an element enabling the sharing user to provide login information for the sharing user's account with the social networking system.

20. The method of claim 1, wherein the interface comprises an element enabling the sharing user to provide a comment, and wherein the transmitted communication comprises the comment.

21. The method of claim 1, wherein the transmitted communication comprises an element enabling a viewer to re-share the content.

22. The method of claim 1, further comprising:
   tracking a measure of popularity of the shared content and displaying the tracked measure of popularity to one or more users of the social networking system.

23. The computer program product of claim 8, wherein the sharing control is located on the web page.

24. The computer program product of claim 8, wherein the sharing control is located on a toolbar of a browser application used by the sharing user to view the web page.

25. The computer program product of claim 8, wherein the interface comprises an element enabling the sharing user to provide login information for the sharing user's account with the social networking system.

26. The computer program product of claim 8, wherein the interface comprises an element enabling the sharing user to provide a comment, and wherein the transmitted communication comprises the comment.

27. The computer program product of claim 8, wherein the transmitted communication comprises an element enabling a viewer to re-share the content.

28. The computer program product of claim 8, further comprising:
   a tracking module configured to obtain a measure of popularity of the shared content and to display the tracked measure of popularity to one or more users of the social networking system.

* * * * *

UNITED STATES PATENT AND TRADEMARK OFFICE
CERTIFICATE OF CORRECTION

PATENT NO. : 9,602,605 B2  
APPLICATION NO. : 12/259254  
DATED : March 21, 2017  
INVENTOR(S) : James H. Wang et al.

It is certified that error appears in the above-identified patent and that said Letters Patent is hereby corrected as shown below:

In the Claims

Column 15, Line 6, Claim 1, after "to" insert -- the --.
Column 15, Line 63, Claim 8, delete "receiving" insert -- receive --.
Column 16, Line 3, Claim 8, after "to" insert -- the --.

Signed and Sealed this
Third Day of October, 2017

Joseph Matal
*Performing the Functions and Duties of the*
*Under Secretary of Commerce for Intellectual Property and*
*Director of the United States Patent and Trademark Office*